US011183895B2

(12) United States Patent
Locke et al.

(10) Patent No.: US 11,183,895 B2
(45) Date of Patent: Nov. 23, 2021

(54) ELECTRIC MOTOR

(71) Applicant: Dyson Technology Limited, Wiltshire (GB)

(72) Inventors: Simon Alexander Locke, Swindon (GB); Nigel Youatt Dymond, Swindon (GB); Andrew Simeon Barnes, Bath (GB)

(73) Assignee: Dyson Technology Limited, Wiltshire (GB)

( * ) Notice: Subject to any disclaimer, the term of this patent is extended or adjusted under 35 U.S.C. 154(b) by 788 days.

(21) Appl. No.: 15/376,351

(22) Filed: Dec. 12, 2016

(65) Prior Publication Data
US 2017/0170697 A1 Jun. 15, 2017

(30) Foreign Application Priority Data

Dec. 11, 2015 (GB) ...................................... 1521890

(51) Int. Cl.
| | |
|---|---|
| *H02K 3/18* | (2006.01) |
| *H02K 1/14* | (2006.01) |
| *H02K 3/52* | (2006.01) |
| *H02K 21/18* | (2006.01) |
| *H02K 37/16* | (2006.01) |
| *H02K 15/02* | (2006.01) |
| *H02K 1/27* | (2006.01) |
| *H02K 7/14* | (2006.01) |

(52) U.S. Cl.
CPC .............. *H02K 3/18* (2013.01); *H02K 1/141* (2013.01); *H02K 1/143* (2013.01); *H02K 1/27* (2013.01); *H02K 3/524* (2013.01); *H02K 7/14* (2013.01); *H02K 15/028* (2013.01); *H02K 21/18* (2013.01); *H02K 21/185* (2013.01); *H02K 37/16* (2013.01)

(58) Field of Classification Search
CPC ...... H02K 15/028; H02K 1/141; H02K 1/143; H02K 1/27; H02K 21/18; H02K 21/185; H02K 37/16; H02K 3/18; H02K 3/524; H02K 7/14; H02K 3/325; H02K 5/20; H02K 1/18; H02K 1/185
See application file for complete search history.

(56) References Cited

U.S. PATENT DOCUMENTS

| | | |
|---|---|---|
| 3,495,111 A | 2/1970 | Haydon |
| 3,593,049 A | 7/1971 | Dittrich et al. |
| 4,166,265 A | 8/1979 | Reynolds et al. |

(Continued)

FOREIGN PATENT DOCUMENTS

| | | |
|---|---|---|
| CN | 101316066 | 12/2008 |
| CN | 206302219 | 7/2017 |

(Continued)

OTHER PUBLICATIONS

Search Report dated May 27, 2016, directed to GB Application No. 1521890.2; 2 pages.

(Continued)

*Primary Examiner* — Emily P Pham

(57) ABSTRACT

An electric motor comprising: a frame; and a stator assembly; the stator assembly including a bobbin assembly and at least one c-shaped stator core. The frame comprises at least one lug, the bobbin assembly includes at least one recess, and the stator assembly is fixed to the frame by fixing the lug inside the recess of the bobbin assembly.

10 Claims, 4 Drawing Sheets

(56) References Cited

U.S. PATENT DOCUMENTS

| | | | |
|---|---|---|---|
| 4,259,603 A * | 3/1981 | Uchiyama | H02K 1/2786 310/156.21 |
| 4,720,646 A | 1/1988 | Torimoto | |
| 5,073,735 A * | 12/1991 | Takagi | H02K 5/04 310/71 |
| 5,275,141 A | 1/1994 | Tsunoda et al. | |
| 5,604,971 A | 2/1997 | Steiner | |
| 5,627,424 A | 5/1997 | Steiner | |
| 5,708,406 A | 1/1998 | Tsunoda et al. | |
| 5,943,760 A | 8/1999 | Barzideh et al. | |
| RE36,545 E | 2/2000 | Steiner | |
| 6,356,046 B1 | 3/2002 | Koumura et al. | |
| 2003/0098660 A1 | 5/2003 | Erdman et al. | |
| 2004/0155549 A1 | 8/2004 | Marioni | |
| 2007/0052318 A1 | 3/2007 | Marioni | |
| 2008/0303374 A1 | 12/2008 | Yokoyama et al. | |
| 2009/0009014 A1 | 1/2009 | Binder et al. | |
| 2010/0225197 A1 | 9/2010 | Fulford et al. | |
| 2011/0043067 A1 * | 2/2011 | Li | H02K 1/141 310/158 |
| 2011/0162225 A1 | 7/2011 | Obermann et al. | |
| 2012/0181793 A1 | 7/2012 | Hein | |
| 2013/0181556 A1 * | 7/2013 | Li | H02K 3/522 310/71 |
| 2013/0249330 A1 * | 9/2013 | King | H02K 21/14 310/43 |
| 2014/0132106 A1 | 5/2014 | Horst et al. | |
| 2014/0132110 A1 * | 5/2014 | Burton | H02K 1/18 310/216.131 |
| 2014/0167534 A1 * | 6/2014 | Hata | H02K 37/14 310/49.01 |
| 2014/0246942 A1 | 9/2014 | Greetham et al. | |
| 2014/0328670 A1 | 11/2014 | Lamb | |
| 2014/0328684 A1 * | 11/2014 | King | F04D 29/584 416/95 |
| 2015/0137639 A1 | 5/2015 | Gomyo et al. | |
| 2017/0033637 A1 * | 2/2017 | Matsuoka | H02K 3/50 |
| 2017/0093262 A1 | 3/2017 | Li et al. | |
| 2017/0170693 A1 | 6/2017 | Dymond et al. | |

FOREIGN PATENT DOCUMENTS

| | | |
|---|---|---|
| DE | 1117 213 | 11/1961 |
| EP | 1 267 470 | 12/2002 |
| EP | 1 437 817 | 7/2004 |
| FR | 2 667 995 | 4/1992 |
| GB | 2 248 728 | 4/1992 |
| GB | 2 362 268 | 11/2001 |
| GB | 2495545 | 4/2013 |
| JP | 54-48306 | 4/1974 |
| JP | 60-26446 | 2/1985 |
| JP | 60-26447 | 2/1985 |
| JP | 60-144135 | 7/1985 |
| JP | 60-134401 | 9/1985 |
| JP | 3-203547 | 9/1991 |
| JP | 9-97711 | 4/1997 |
| JP | 2001-327148 | 11/2001 |
| JP | 2001-327151 | 11/2001 |
| JP | 2006-191718 A | 7/2006 |
| JP | 2007-295771 | 11/2007 |
| JP | 2010-207081 A | 9/2010 |
| JP | 2013-201893 | 10/2013 |
| JP | 2015-95947 | 5/2015 |
| JP | 2015-142497 A | 8/2015 |
| KR | 10-2015-0134391 A | 12/2015 |
| RU | 109349 U1 | 10/2011 |
| RU | 2506024 C2 | 2/2014 |
| RU | 2540415 C2 | 2/2015 |
| WO | WO-2015/159250 | 10/2015 |

OTHER PUBLICATIONS

International Search Report and Written Opinion dated Mar. 14, 2017, directed to International Application No. PCT/GB2016/053702; 12 pages.

Dymond et al., U.S. Office Action dated Oct. 4, 2018, directed to U.S. Appl. No. 15/376,422; 15 pages.

Dymond et al., U.S. Office Action dated Oct. 9, 2019, directed to U.S. Appl. No. 15/376,422; 13 pages.

Notification of Reason for Refusal dated Nov. 18, 2019, directed to KR Application No. 10-2018-7017209; 9 pages.

Official Action dated Apr. 3, 2019, directed to RU Application No. 2018123541; 8 pages.

Notification of Reason for Rejection dated May 25, 2020, directed to JP Application No. 2019-059831; 6 pages.

* cited by examiner

ELECTRIC MOTOR

REFERENCE TO RELATED APPLICATIONS

This application claims the priority of United Kingdom Application No. 1521890.2, filed Dec. 11, 2015, the entire contents of which are incorporated herein by reference.

FIELD OF THE INVENTION

The present invention relates to an electric motor.

BACKGROUND OF THE INVENTION

Electric motors typically comprise a rotor assembly, a stator assembly and a frame which holds the components together. The stator assembly is typically mounted to the frame using the iron stator core. This allows the positioning of the stator core relative to other components of the motor, such as the rotor assembly, to be carefully controlled to a very high tolerance. However, using the stator cores in a structural role and for relative positioning in this way requires the stator cores to be made very robust and to a very high tolerance. This can result in stator cores that are bulky, heavy and expensive to manufacture. In addition, the requirement for such stator cores to include mounting features, for example through holes and/or cut away portions can give rise to magnetic "pinch points" where high levels of magnetic saturation can occur during operation of the motor. This can reduce the efficiency and performance of the motor.

Accordingly, an improved electric motor is required which can go some way to alleviate the problems discussed above.

SUMMARY OF THE INVENTION

Aspects of this invention provide an electric motor comprising: a frame; and a stator assembly; the stator assembly comprising a bobbin assembly and at least one c-shaped stator core. The frame comprises at least one lug, the bobbin assembly comprises at least one recess, and the stator assembly is fixed to the frame by fixing the lug inside the recess of the bobbin assembly.

As a result, the bobbin assembly bears the duty of fixing the stator assembly to the frame instead of the c-shaped stator core. Accordingly, the stator core can be made smaller, lighter and cheaper, which in turn can result in a small, lighter and cheaper electric motor. In addition, the c-shaped stator cores will not require intrusive mounting features such as through-holes and cut-out portions, and so more design freedom is afforded to the stator cores which allows for reduced magnetic saturation during use and therefore a motor with improved efficiency and performance.

The stator assembly may be fixed to the frame only at the bobbin assembly. This allows for a cheaper and easier manufacturing process, and helps reduce the cost of the components of the motor and their assembly.

The lug may be fixed inside the recess of the bobbin assembly by one or a combination of an interference fit and adhesive.

The bobbin assembly may comprise two bobbin portions. This allows for an easier winding operation to wind wires around the bobbin, with each bobbin portion being able to be wound separately before bringing both bobbin portions together to form the bobbin assembly when the motor is being assembled.

The frame may comprise two lugs and each bobbin portion may comprise a recess. Accordingly, both bobbin portions within the bobbin assembly is fixed to the frame, such that the overall bond between the bobbin assembly and the frame is stronger, and no single bobbin portion has a weaker connection with the frame than the other.

The recess in the bobbin assembly may be positioned substantially adjacent a slot opening between stator poles of the at least one c-shaped stator core. Accordingly, space within the stator assembly which would otherwise be empty is efficiently used, and the overall size of the stator assembly, and therefore the motor, can be minimised.

The bobbin assembly may comprise a central part and a plurality of hollow bobbin arms extending from the central part, and the central part may comprise the recess. Windings may be wound around the hollow bobbin arms, and pole arms of the c-shaped stator core may extend through the hollow bobbin arms. This allows for a stator assembly that makes particularly efficient use of space.

The frame may comprise an inner wall, and the lug may extend axially downstream from an end of the inner wall. As such, the stator assembly can be fixed axially to the end of the inner wall, thus helping to keep the radial size of the motor minimised.

The motor may further comprise a rotor assembly, and the rotor assembly may be fixed to the inner wall. As a result, the stator assembly and the rotor assembly are both fixed to the inner wall, which helps to maintain a close relationship between the two and allows for their relative positioning to be controlled during assembly of the motor and maintained at a high tolerance.

The rotor assembly may comprise an impeller positioned upstream of the inner wall. As a result, the airflow generated by the impeller while the motor is running passes downstream and flows past the stator assembly helping to cool the windings as it passes.

BRIEF DESCRIPTION OF THE DRAWINGS

In order that the present invention may be more readily understood, embodiments of the invention will now be described, by way of example, with reference to the following accompanying drawings, in which.

DETAILED DESCRIPTION OF THE INVENTION

Figure 1:
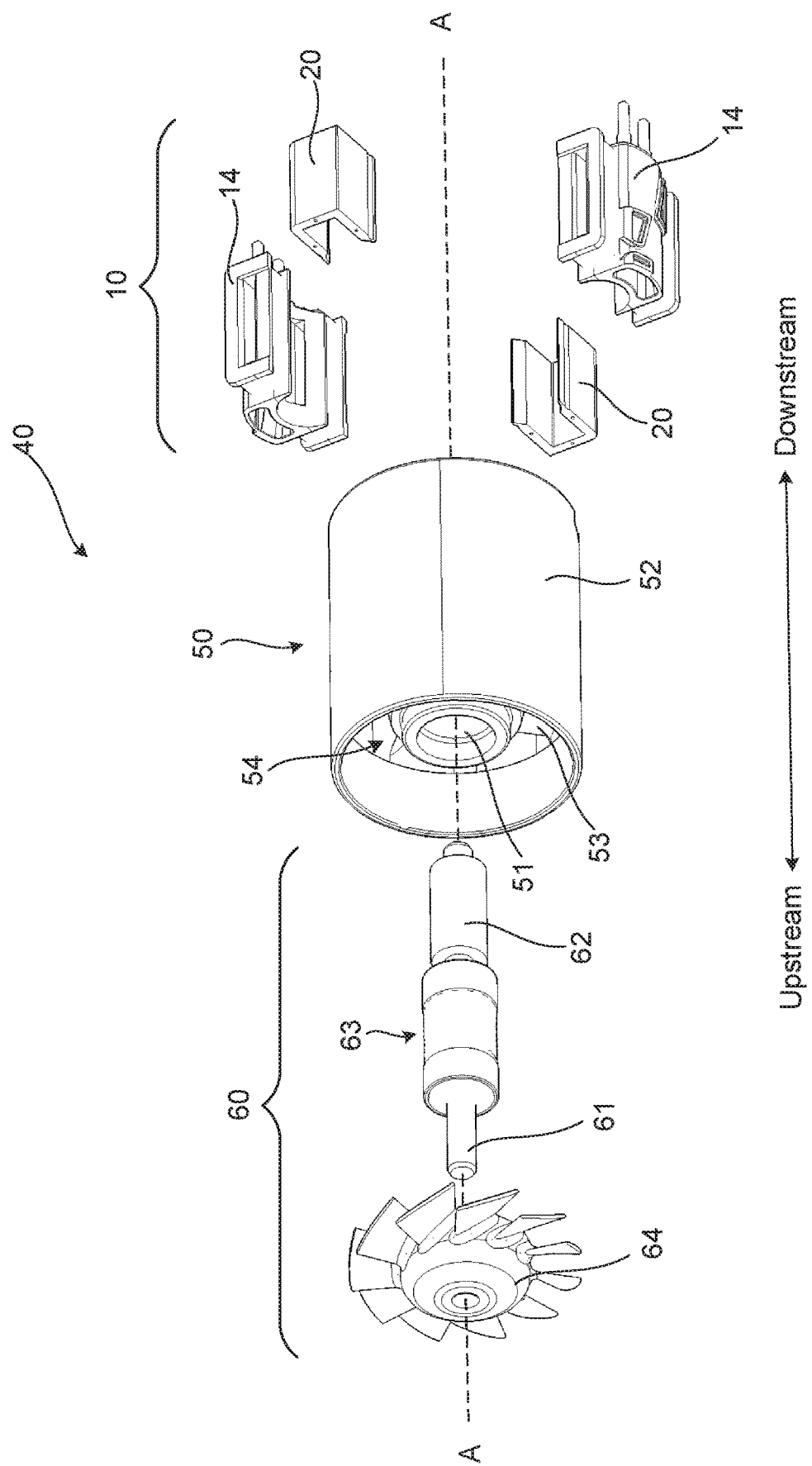
FIG. 1 is an exploded perspective view of an electric motor.

FIG. 1 shows an exploded perspective view of an electric motor 40. The electric motor 40 comprises a stator assembly 10, and also comprises a frame 50 and a rotor assembly 60. The frame 50 comprises an inner wall 51 and an outer wall 52. The outer wall 52 surrounds the inner wall 51 such that an annular channel 54 is defined between them. A number of diffuser vanes 53 extend between the inner wall 51 and the outer wall 52 through the annular channel 54. The rotor assembly 60 comprises a shaft 61, a magnet 62, a bearing assembly 63 and an impeller 64. When assembled, the magnet 62, bearing assembly 63 and impeller 64 are all fixed directly to the shaft 61 by one or a combination of an interference fit and adhesive. The magnet 62 is a bonded permanent magnet of the sort typically used in permanent magnet brushless motors, and in the example shown the magnet 62 is a four-pole permanent magnet.

The rotor assembly 60 is supported in the frame 50 by the inner wall 51. The bearing assembly 63 is fixed inside the bore defined by the inner wall 51 such that the inner wall 51 of the frame 50 acts as a protective sleeve around the bearing assembly 63. This eliminates the need for the bearing assembly 63 to have a separate protective sleeve, and helps to reduce the size and weight of the motor 40. When the motor 40 is fully assembled, the magnet 62 extends beyond the inner wall 51 of the frame 50 such that it is positioned wholly within the stator assembly 10 between the c-cores 20.

For the sake of clarity, the term "axial" is intended to mean in the direction of an axis running along a rotational axis of the motor 40 as depicted by axis A-A in FIG. 1. In addition, the directional terms "upstream" and "downstream" referred to herein refer to the direction of airflow through the motor when in use and are further clarified by the double headed arrow in FIG. 1.

Figure 2:
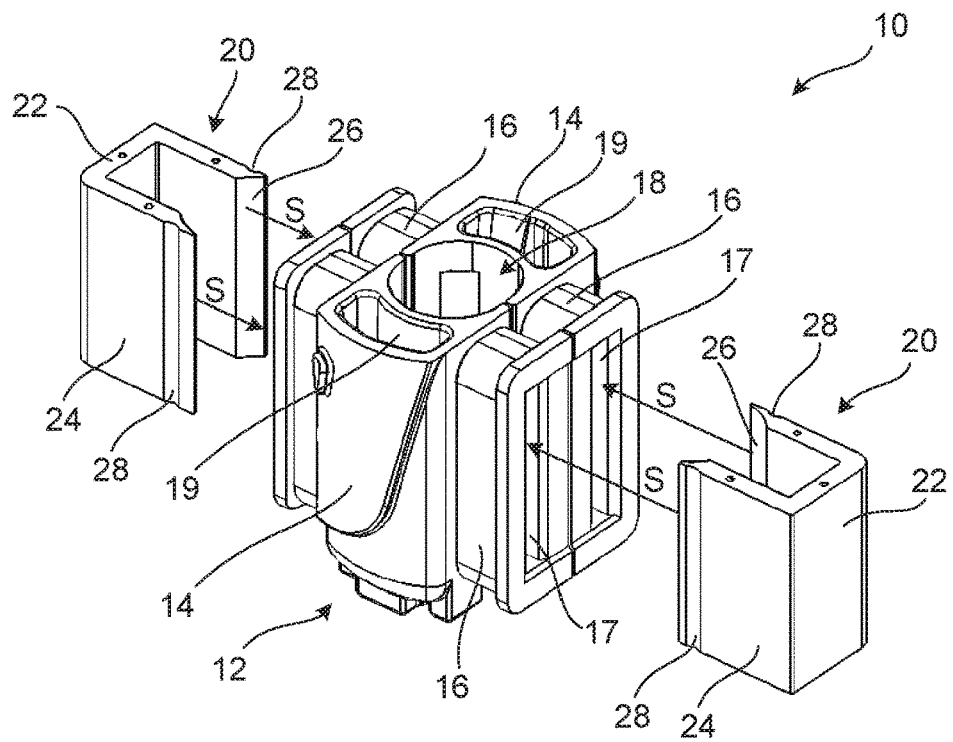
FIG. 2 is a stator assembly of the motor shown in FIG. 1.

FIG. 2 shows the stator assembly 10. The stator assembly 10 comprises two c-shaped stator cores 20 and a bobbin assembly 12. Each c-shaped stator core 20 (also referred to as a c-core) comprises a back 22 and two pole arms 24 extending from the back 22. At the end of each pole arm 24 is a pole face 26. On the outer side of each pole arm 24 behind the pole face 26 is a groove 28 that runs along the axial length of the pole arm 24. The groove 28 provides a volume into which adhesive can collect, this area ensures that there is a solid adhesive bond between the c-core 20 and the bobbin assembly 12. It will be understood that by having the pole faces 26 at the end of the pole arms 24, there is the possibility that the pole arms 24 could flex under the fluctuating magnetic forces when a magnet rotates close to the c-core 20. Any movement of the pole faces relative to the magnet may have a detrimental effect on the performance of a motor. Therefore, by positioning the groove 28 proximate to the pole face 26, any movement of the pole face 26 is kept to a minimum. By "proximate" it is meant that the groove 28 and the pole face 26 are positioned close enough to one another such that the adhesive bond minimises any movement of the pole face 26 when a rotor magnet is spinning close to the c-core 20.

Alternatively, the pole arms 24 may not comprise any grooves. In this instance, adhesive can be provided along a substantial portion of the outer side of each pole arm such that a large bonding area is provided between the pole arm and the bobbin assembly. This results in a strong adhesive bond which is equally effective in minimising any movement of the pole face 26 when a rotor magnet is spinning.

On each c-core 20, the pole face 26 at the end one pole arm 24 is different to the pole face on the end of the other pole arm for that c-core 20. The reason for the asymmetry between the pole faces 26 is to increase saliency. Increased saliency encourages a rotor to park in a particular position relative to the stator cores when not rotating such that it is easy to restart the motor in a particular direction. If both pole faces 26 on a c-core 20 were the same then it would be difficult to encourage the rotor to rotate in a desired direction when the motor is started.

Figure 3:
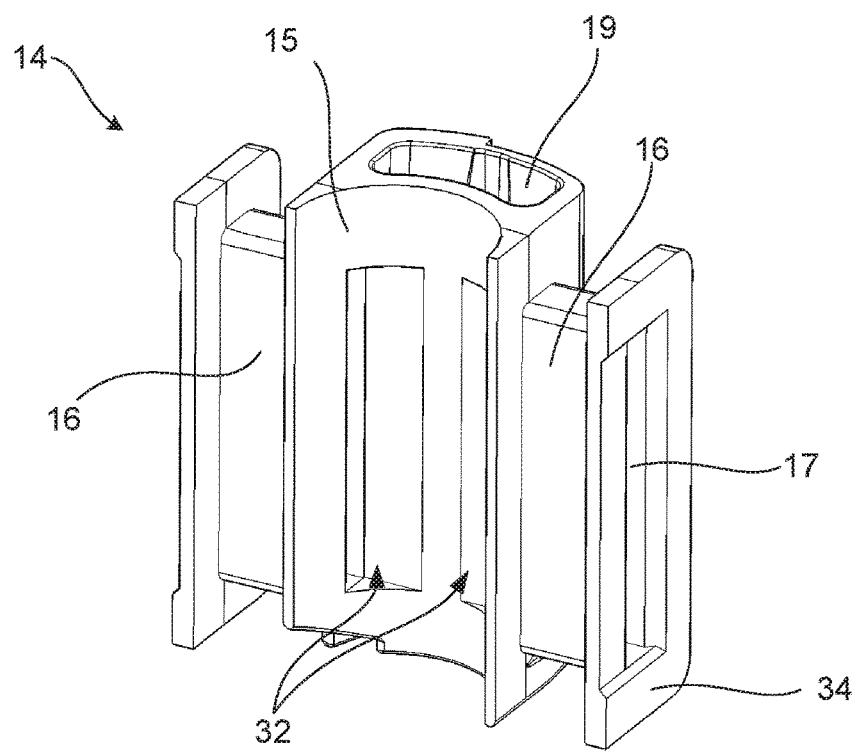
FIG. 3 is a bobbin portion of the stator assembly shown in FIG. 2.

The bobbin assembly 12 comprises two bobbin portions 14. A single bobbin portion 14 is shown in more detail in FIG. 3. Each bobbin portion 14 comprises two hollow bobbin arms 16 extending outwards from a central part of the bobbin portion, each hollow bobbin arm having a flange 34 at the end. The bobbin arms 16 define slots 17 that are able to receive pole arms 24 from the c-cores 20. Windings (not shown) for inducing a magnetic field in the c-cores 20 can be wound around the bobbin arms 16, and the flanges 34 act to keep the windings in place on the bobbin arms 16. The slots 17 through the bobbin arms 16 allow the pole arms 24 of the c-cores 20 to slot into the bobbin assembly 12 such that a winding is positioned around each pole arm 24. FIG. 2 shows how the stator assembly 10 is assembled by sliding the c-cores 20 into the bobbin assembly 12, as represented by the arrows S once both bobbin portions 14 have been brought together into abutment with one another. The c-cores 20 are arranged such that each c-core 20 bridges across both bobbin portions 14, with one pole arm 24 extending through a slot in the first bobbin portion, and the other pole arm 24 extending through a slot in the second bobbin portion.

By bridging the c-cores 20 across the two bobbin portions 14, the two bobbin portions 14 are securely held together by the c-shaped stator cores 20. One reason for providing two separate bobbin portions 14 is that it is easier to wind the windings around the bobbin arms 16 when the bobbin portions are separated. As can be seen from the figures, the flanges 34 abut each other when the two bobbin portions 14 are positioned together such that there is no gap between them. It would be difficult and expensive to wind the windings around the bobbin arms 16 without the bobbin assembly 12 being provided in two separable portions, as it would be necessary to thread the winding wire through the gap between the bobbin arms 16.

Each bobbin portion 14 comprises a semi-cylindrical recess 15 within the central part of the bobbin portion, and when the two bobbin portions 14 are brought together, each of the semi-cylindrical recesses 15 form part of a cylindrical bore 18 through the centre of the bobbin assembly 12. The semi-cylindrical recess 15 on each bobbin portion 14 has two windows 32 that represent the termination of the slots 17 of each bobbin arm 16 inside the bobbin assembly 12. When the stator assembly 10 is fully assembled, the pole faces 26 of the c-cores 20 will be positioned at the windows 32 and will form part of the wall of the bore 18.

The bobbin assembly 12 further comprises fixing recesses 19 which enable the stator assembly 10 to be fixed in a motor. The fixing recesses are located in a central portion of the bobbin assembly 12 which is formed of the central portions of each of the bobbin portions 14. Each bobbin portion 14 comprises one fixing recess 19.

Figure 4:
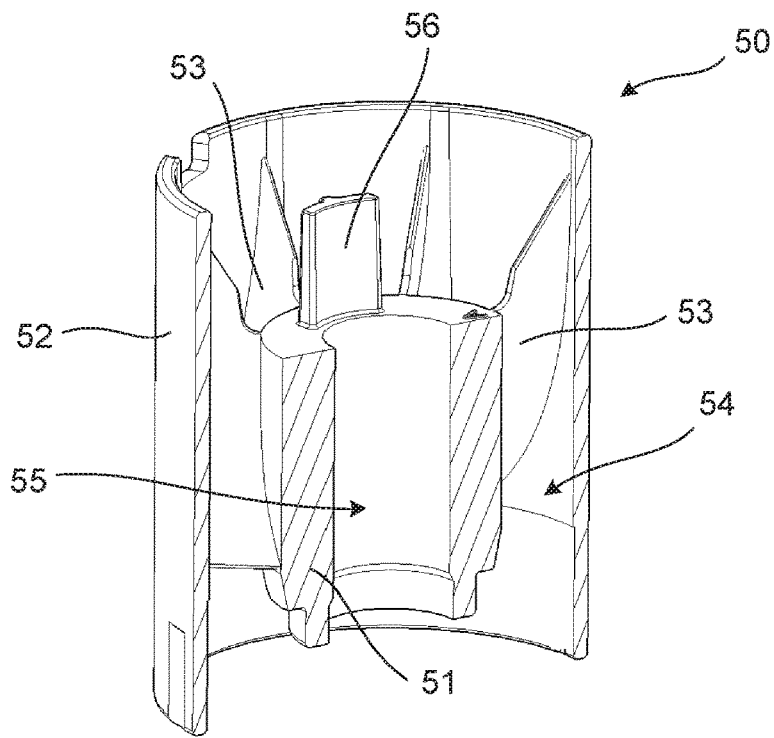
FIG. 4 is a cross section through the frame of the electric motor of FIG. 1.

A cross section through the frame 50 is shown in FIG. 4. The inner wall 51 is cylindrical and defines a bore 55. The inner wall 51 supports the rotor assembly 60 within the bore 55 when the motor 40 is assembled. In addition, the inner wall 51 has a lug 56 that extends from one end of the inner wall 51 in an axial direction. In particular, the lug 56 extends axially in a downstream direction. The lug 56 provides a mounting point onto which the stator assembly 10 can be easily mounted to fix it to the frame 50. FIG. 4 shows a single lug 56, however multiple lugs 56 may be provided depending on the number of fixing recesses 19 provided on the stator assembly 10 and other requirements of the motor. The lugs 56 are positioned such that they are receivable inside the fixing recesses 19 of the bobbin assembly 12. The lugs 56 and fixing recesses 19 may be appropriately sized such that the lugs fit snugly inside the recesses so as to form an interference fit. Alternatively, the recesses 19 may be large enough so as to be able to accommodate the lugs 56 as well as a volume of adhesive. In this instance, during assembly of the motor 40, adhesive may be applied inside the recesses, or to the outside of the lugs, or both, prior to bringing the stator assembly 10 and the frame 50 together.

The term lug used herein is not intended to be limiting in terms of form, size or shape. Indeed, the term lug will be understood to cover any protrusion that that can be inserted into a recess of another component for fixing the two together.

The recesses 19 in the bobbin assembly 12 allow the stator assembly 10 to be fixed to the frame 50 of the motor 40 at the bobbin assembly 12 rather than using the c-cores 20 themselves for mounting. Accordingly, the c-cores 20 do not need to be made as large as they are not required to carry out a structural role. This helps to reduce the cost and weight of the stator assembly, and therefore the whole motor as well. In addition, the c-cores are not required to contain any though holes or cut-away portions for mounting, and therefore they do not suffer from any of the associated magnetic saturation problems that can arise therefrom.

Figure 5:
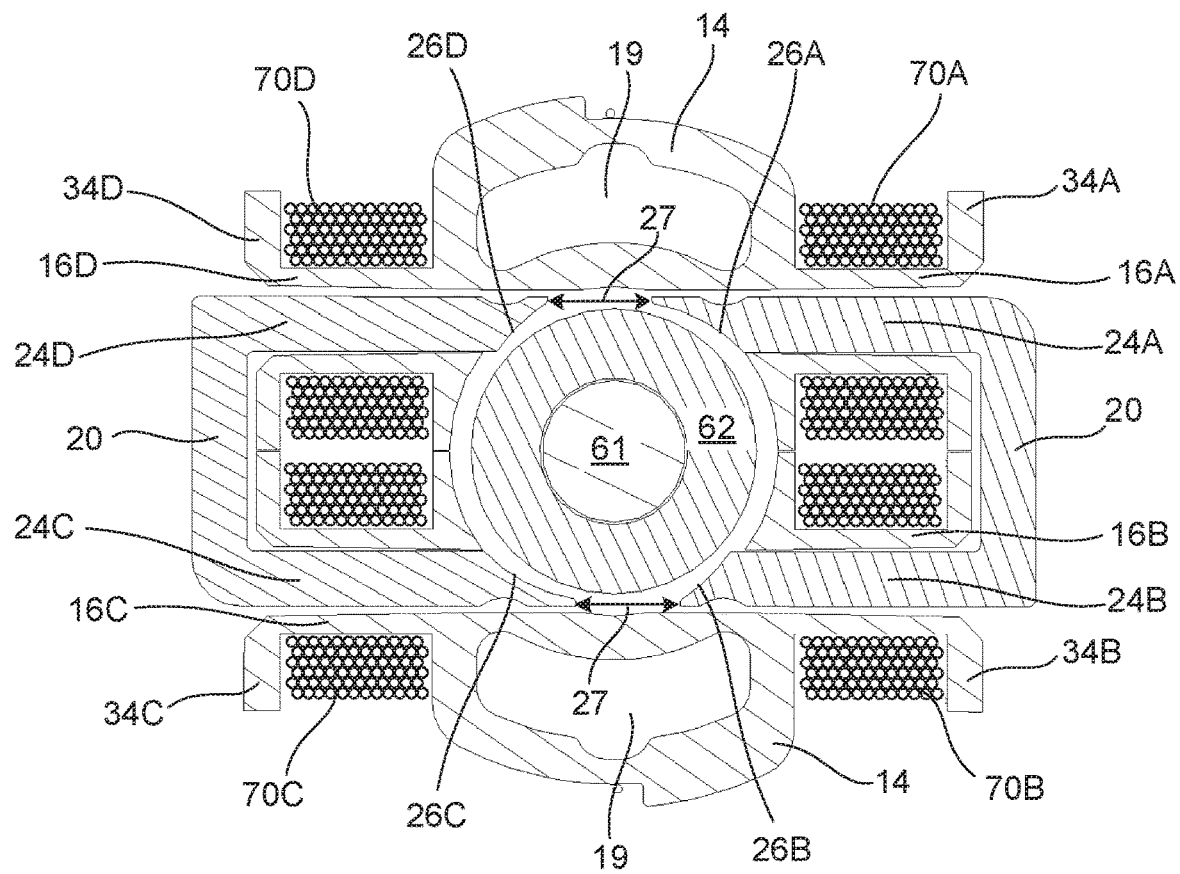
FIG. 5 is a cross section through the assembled stator assembly and rotor assembly.

FIG. 5 shows a cross section through the assembled stator assembly 10 and rotor assembly 60. The central part of each bobbin portion 14 comprises the fixing recess 19. One of the bobbin portions 14 comprises bobbin arms 16A and 16D, and the other of the bobbin portions 14 comprises bobbin arms 16B and 16C. Windings 70A-D are wound around each of the bobbin arms 16A-D and held in place by the flanges 34A-D respectively. Two c-cores 20 are provided, a first c-core comprises pole arms 24A and 24B, and the other of the c-cores comprises pole arms 24C and 24D. Pole faces 26A-D are provided at the end of each of the pole arms 24A-D respectively. The c-cores 20 are positioned such that the pole arms 24A-D extend through the slots in the hollow bobbin arms 16A-D, and in such a way that each c-core 20 bridges across both bobbin portions 14. For instance, as shown in FIG. 5, pole arm 24A of one of the c-cores extends through a slot in bobbin arm 16A of one of the bobbin portions, whilst pole arm 24B of the same c-core extends through a slot in bobbin arm 16B in a different bobbin portion. The same applies for the other of the two c-cores: pole arm 24C extends through a slot in bobbin arm 16C in one of the bobbin portion, whereas pole arm 24D extends through a slot in bobbin arm 16D in the other bobbin portion.

Accordingly, with the c-cores arranged in this way, windings 70A-D are positioned around each of the pole arms 24A-D respectively, and when current is passed through the windings 70A-D a magnetic field is induced through the c-cores 20 and at the pole faces 26A-D.

The shaft 61 and magnet 62 of the rotor assembly 60 are positioned inside the stator assembly 10 between the c-cores 20 and within the cylindrical bore that is formed by the two semi-cylindrical recesses of the bobbin portions 14. The magnet 62 has four poles (not shown) which magnetically interact with the four pole faces 26A-D during operation of the motor 40.

By having the recess 19 in the central part of each bobbin portion 14, it is positioned close to the slot opening 27 which is the gap between the poles. This makes efficient use of space within the stator assembly. Space within the bobbin assembly 12 around the pole arms 24 of the c-cores 20 will be taken up by windings. However, the space around the slot openings 27 is typically free from any such requirements. Utilising this space for the recesses 19 allows for the stator assembly to be made smaller as no extraneous external mounting features around the outside of the stator assembly are required. It also allows for a less restrictive airflow around the outside of the stator assembly.

Figure 6:
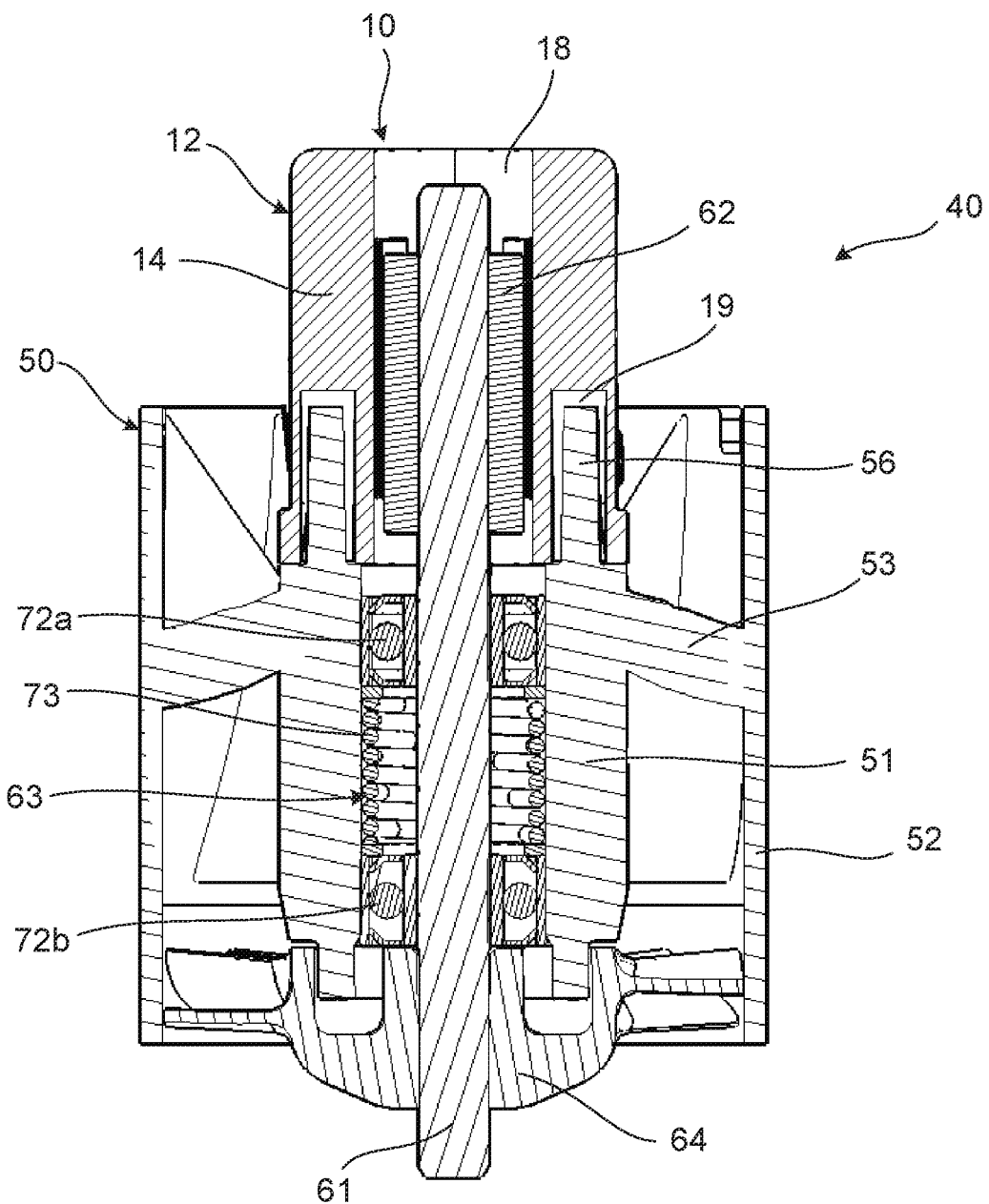
FIG. 6 is a cross section through the assembled motor of FIG. 1.

FIG. 6 shows a cross section through the assembled motor 40. The cross section is taken through the motor such that it passes through the slot openings 27, as such neither of the c-cores can be seen. However, the cross section passes directly through the central part of each bobbin portion 14, and as such the lugs 56 of the frame 50 are visible fixed inside the recesses 19 of the bobbin assembly 12. There is space around the lugs 56 within the recesses 19 which contains adhesive (not shown) to fix the two together.

The stator assembly 10 is fixed to the downstream end of the inner wall 51, and the impeller 64 is fixed to the shaft 61 at the upstream end of the inner wall 51. The airflow generated by the impeller therefore flows through the frame 50 and passes the stator assembly 10. The airflow therefore helps to cool the windings of the motor 40 during operation.

The magnet 62 is fixed to the shaft 61 and is positioned within the bore 18 of the stator assembly 12 such that it aligns axially with the c-cores (not shown). The bearing assembly 63 comprises a pair of bearings 72a, 72b, and a spring 73 separating the bearings 72a, 72b. The spring 73 acts to pre-load each of the outer races of the bearings 72a, 72b to reduce wear of the bearings during use. Washers may also be provided between the spring 73 and each of the bearings 72a, 72b.

Whilst particular embodiments have thus far been described, it will be understood that various modifications may be made without departing from the scope of the invention as defined by the claims.

The invention claimed is:

1. An electric motor comprising:
a frame; and
a stator assembly, the stator assembly comprising a bobbin assembly and at least one c-shaped stator core,
wherein the frame comprises at least one lug, the bobbin assembly comprises at least one recess, and the stator assembly is fixed to the frame by fixing the at least one lug inside the at least one recess of the bobbin assembly, and wherein the bobbin assembly comprises a central part and a plurality of hollow bobbin arms extending from the central part, and wherein the central part comprises the at least one recess.

2. The electric motor of claim 1, wherein the stator assembly is fixed to the frame only at the bobbin assembly.

3. The electric motor of claim 1, wherein the at least one lug is fixed inside the at least one recess of the bobbin assembly by one or a combination of an interference fit and adhesive.

4. The electric motor of claim 1, wherein the bobbin assembly comprises two bobbin portions.

5. The electric motor of claim 4, wherein the frame comprises two lugs and the at least one recess of the bobbin assembly is located on each bobbin portion.

6. The electric motor of claim 1, wherein the at least one recess in the bobbin assembly is positioned adjacent a slot opening between stator poles of the at least one c-shaped stator core.

7. The electric motor of claim 1, wherein windings are wound around the hollow bobbin arms, and pole arms of the at least one c-shaped stator core extend through the hollow bobbin arms.

8. The electric motor of claim 1, wherein the frame comprises an inner wall, and the lug extends axially downstream from an end of the inner wall.

9. The electric motor of claim 8, further comprising a rotor assembly, and the rotor assembly is fixed to the inner wall.

10. The electric motor of claim 9, wherein the rotor assembly comprises an impeller positioned upstream of the inner wall.

\* \* \* \* \*